Patented Mar. 17, 1925.

1,529,648

UNITED STATES PATENT OFFICE.

ROBERT L. CORBY, OF NEW YORK, N. Y., ASSIGNOR TO THE FLEISCHMANN COMPANY, OF NEW YORK, N. Y., A CORPORATION OF OHIO.

PREPARATION AND TREATMENT OF BREAD DOUGH.

No Drawing.   Application filed January 23, 1925. Serial No. 4,153.

*To all whom it may concern:*

Be it known that I, ROBERT L. CORBY, a citizen of the United States, residing at New York, in the county of New York and State of New York, have invented certain new and useful Improvements in the Preparation and Treatment of Bread Dough, of which the following is a full, clear, and exact description, such as will enable others skilled in the art to which it appertains to make and use the same.

This invention relates to the preparation and treatment of dough, and more particularly to the preparation and treatment of dough for the manufacture of bread, and has for its object generally to produce a bread loaf having good volume, crust, and texture of crumb, in a manner which is more economical and efficient than heretofore.

More specifically an object of this invention is to provide an improved process for the manufacture of bread in such manner that the capacity of any bakery, particularly the machinery thereof, is substantially increased, and the cost of the production of the bread is reduced, both by the reduction of the time factor in the dough preparation, and by the avoidance of the need of artificial refrigeration during the handling of the dough.

Other objects of the invention will in part be obvious and will in part appear hereinafter.

This invention comprises an improvement in the invention disclosed in my copending application, Serial No. 628,392, filed March 28, 1923.

In the said copending application there is disclosed a novel and improved process of manufacturing bread according to the straight dough method, which is characterized particularly by the fact that by the use of a somewhat higher dough temperature than has heretofore been employed, and with but little or slightly more yeast, the "dough time" (that is the time between the mixing and dividing of the dough during which the dough is allowed to ferment), may be reduced substantially to zero or entirely eliminated, without unfavorably affecting, and in fact, in some respects improving the quality of the bread produced.

In the present invention not only is the desirable improved procedure of my copending application retained, but there is also included an additional step in the control of the dough temperatures which although not essential to the successful operation of the therein described process, is believed to render more simple the commercial practice of the process and generally to improve the quality of the bread produced thereby.

In the carrying out of the present invention, any desired suitable bread dough ingredient formula for a straight time dough process may be used, but preferably one in which the yeast amounts to from 2% to 3% of the weight of the flour, and as is described in the said copending application, the bread dough ingredients are mixed under such temperature conditions that the resulting dough batch attains a temperature of not less than 85° F., and even up to as high as 100° F., but preferably about 88° F., and the batch may be transferred directly to the divider for subdivision into loaf units of the desired size, and may then be rounded, sealed, "short proofed", formed into loaves, placed in the pans, given a final proof, and baked in the oven, the operations being carried out either by hand or machinery in the usual manner. Throughout these operations, it is important however, that the temperature of the dough, prior to baking, shall at no time be allowed to fall below 84° F.

As an improved step, it has been found that in carrying out the above process, a better uniformity and quality of bread is obtained particularly in the case of machine formed loaves, if the temperature in the proofing room is made somewhat higher than that usually used. For example, it has been found that a suitable temperature at which to maintain the proofing is approximately 108° to 115° F., and if desired the atmosphere may be suitably tempered by the controlled introduction of steam or humidified air.

In the carrying out of this process, the usual proofing times are substantially adhered to, that is, the short proof is accomplished in from about ten to fifteen minutes and the final proof in from twenty-five to thirty-five minutes, the exact extent of the time being regulated in the usual manner in accordance with the appearance of the loaf unit.

The bread produced by the present process has excellent appearance, appetizing flavor, firm texture, and also has a slightly thicker wall and retains its freshness for a longer period of time than bread made by the heretofore known process.

Having described my invention, what I claim as new and desire to secure by Letters Patent, is:

1. In a straight dough process of making yeast-leavened bread, the improvement which comprises mixing the dough ingredients under controlled temperature conditions such that when completely mixed the resulting dough batch will have attained a temperature of not less than 85° F., nor more than 100° F., substantially immediately subdividing the batch into loaves preparatory to introduction into the oven for baking, and proofing the loaves in an atmosphere having a temperature of from 108° to 115° F.

2. In a straight-dough process of making yeast-leavened bread, the improvement which comprises mixing the dough ingredients under controlled temperature conditions such that when completely mixed the resulting dough batch will have attained a temperature of not less than 85° F., nor more than 100° F., maintaining the dough temperature thereafter without substantial drop, substantially immediately dividing the batch into loaves preparatory to introduction into the oven for baking, and proofing the loaves in an atmosphere having a temperature of from 108° to 115° F.

3. In a straight-dough process of making yeast-leavened bread, the improvement which comprises mixing the dough ingredients under controlled temperature conditions such that when completely mixed the resulting dough batch will have attained a temperature of approximately 90° F., maintaining the dough temperature thereafter without substantial drop, substantially immediately subdividing the batch into loaves, and proofing the loaves in an atmosphere having a temperature of from 108° to 115° F.

4. In a straight-dough process of making yeast-leavened bread, the improvement which comprises mixing together wheat flour, yeast, water and other auxiliary bread-dough ingredients until a dough-temperature is attained such that without "dough-time" fermentation, the dough will yield a bread loaf of good volume, crust, and texture of crumb; substantially immediately subdividing the batch into loaves, thereafter proofing for the usual short time in an atmosphere having a temperature of from 108° to 115° F., and baking.

In testimony whereof I affix my signature, in the presence of two witnesses.

ROBERT L. CORBY.

Witnesses:
 LOUISE BATES,
 CHARLES N. FREY.